Nov. 4, 1924.

W. G. THOMAS 1,514,353

REGISTER AND INDICATOR

Filed Nov. 7, 1919   10 Sheets-Sheet 1

Inventor
Winthrop G. Thomas
per Sheffield & Betts
Attorneys

Nov. 4, 1924.

W. G. THOMAS 1,514,353

REGISTER AND INDICATOR

Filed Nov. 7, 1919 10 Sheets-Sheet 2

Inventor
Winthrop G. Thomas
per Sheffield & Betts
Attorneys

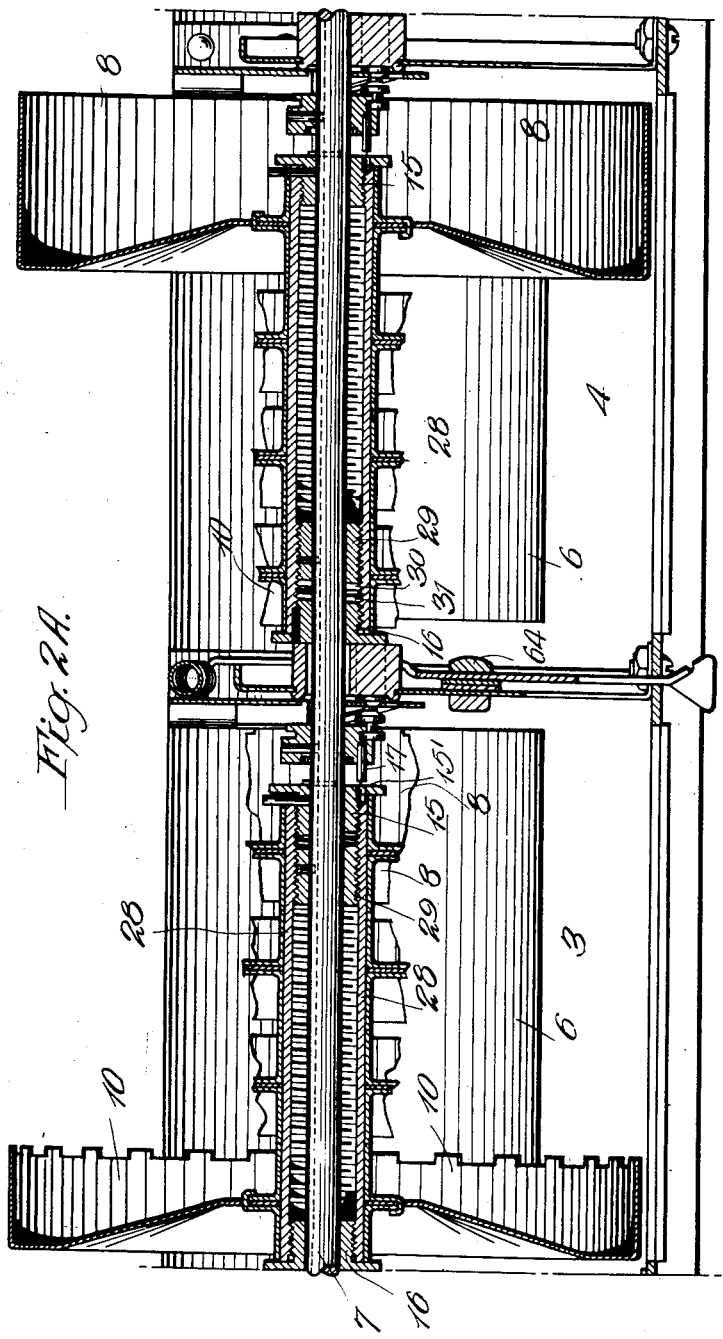

Nov. 4, 1924.
W. G. THOMAS
1,514,353
REGISTER AND INDICATOR
Filed Nov. 7, 1919  10 Sheets-Sheet 4
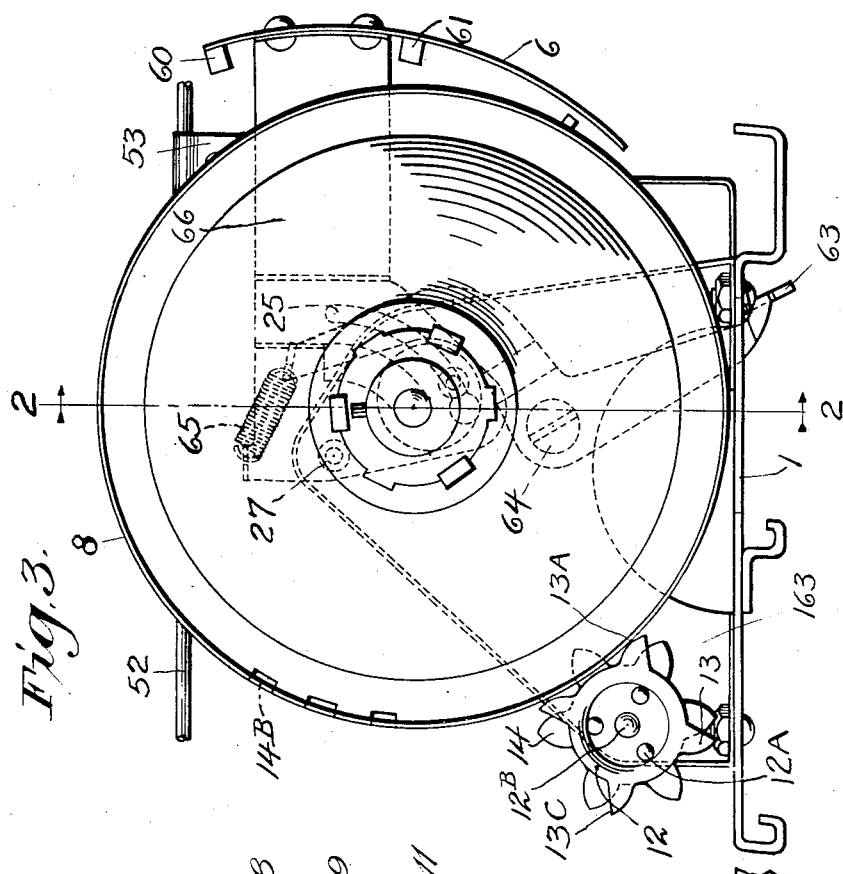
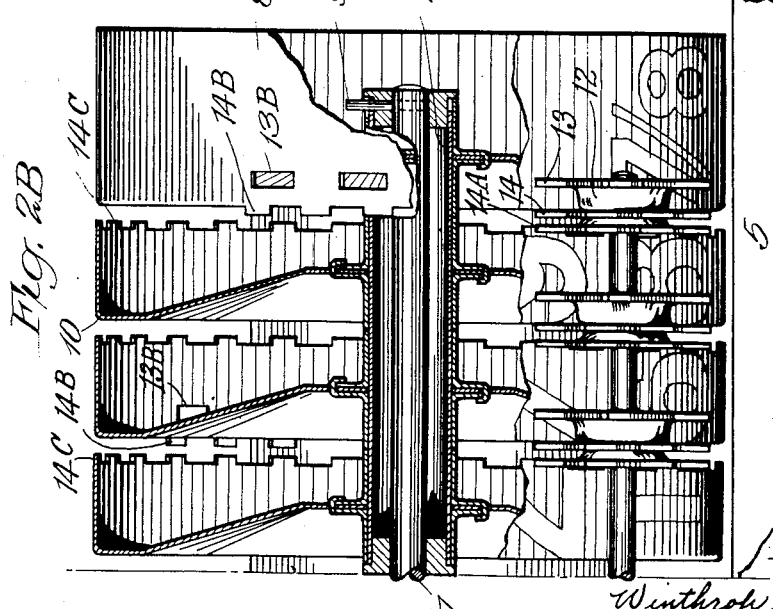
Inventor
Winthrop G. Thomas
per Sheffield & Betts
Attorneys

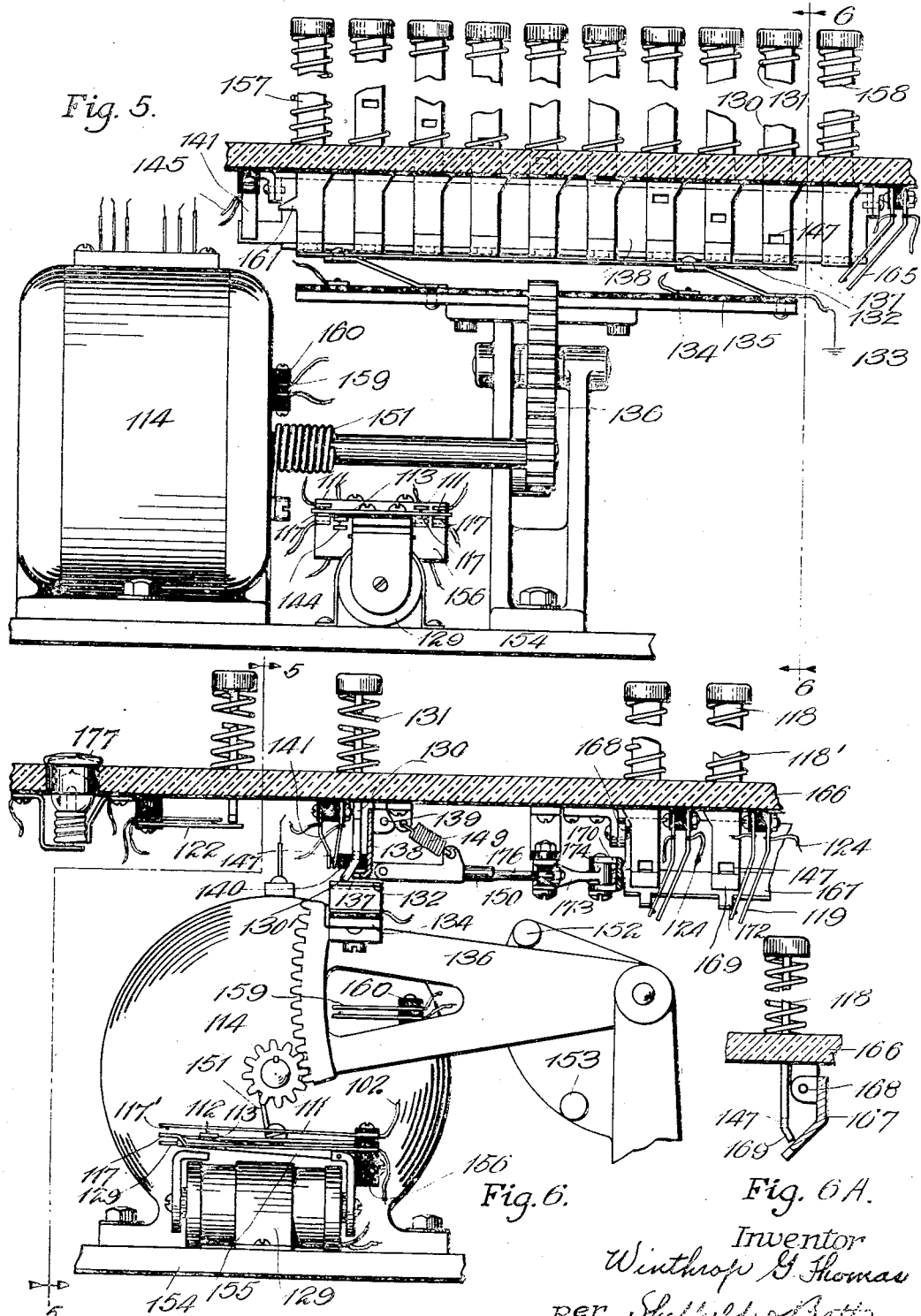

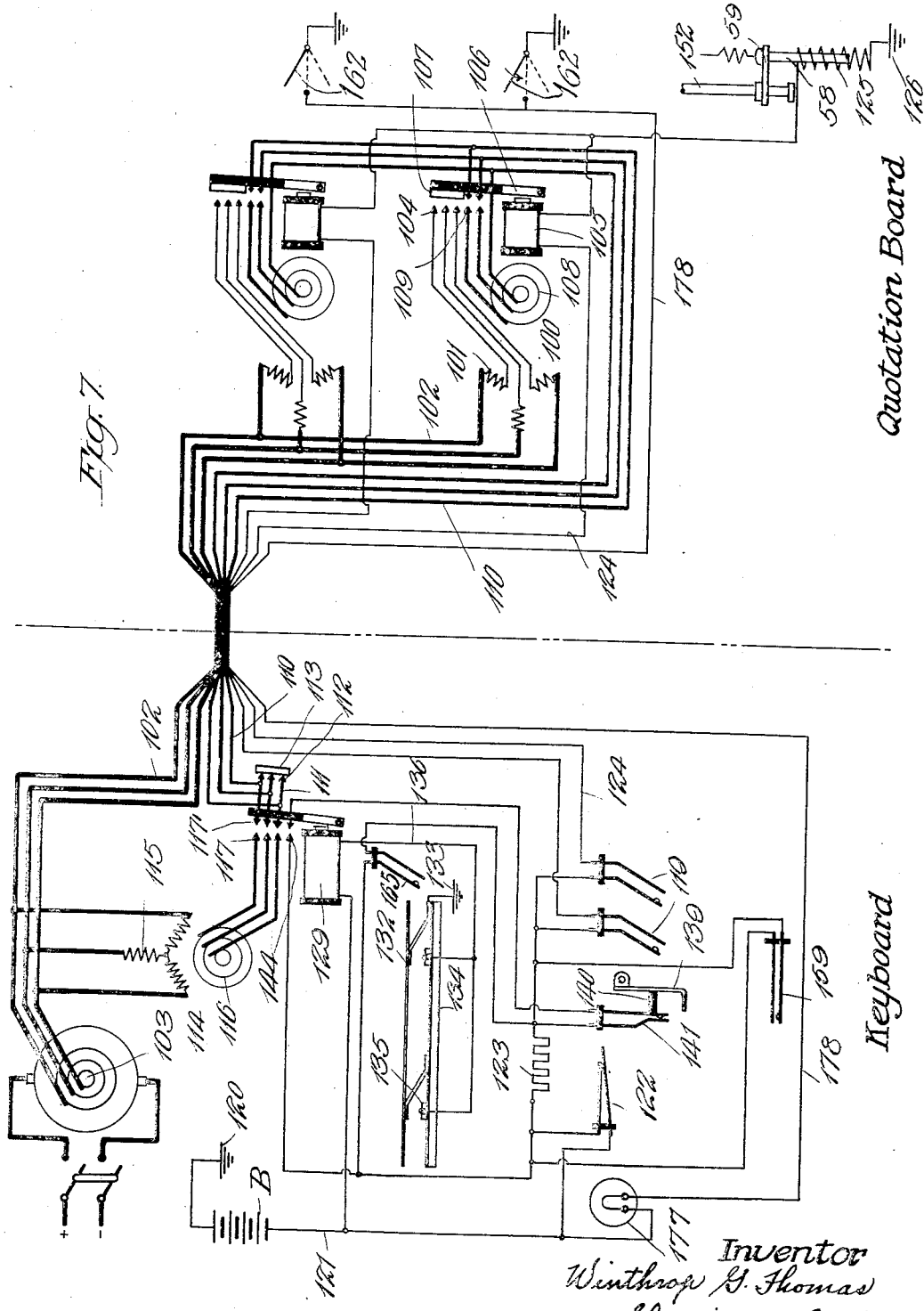

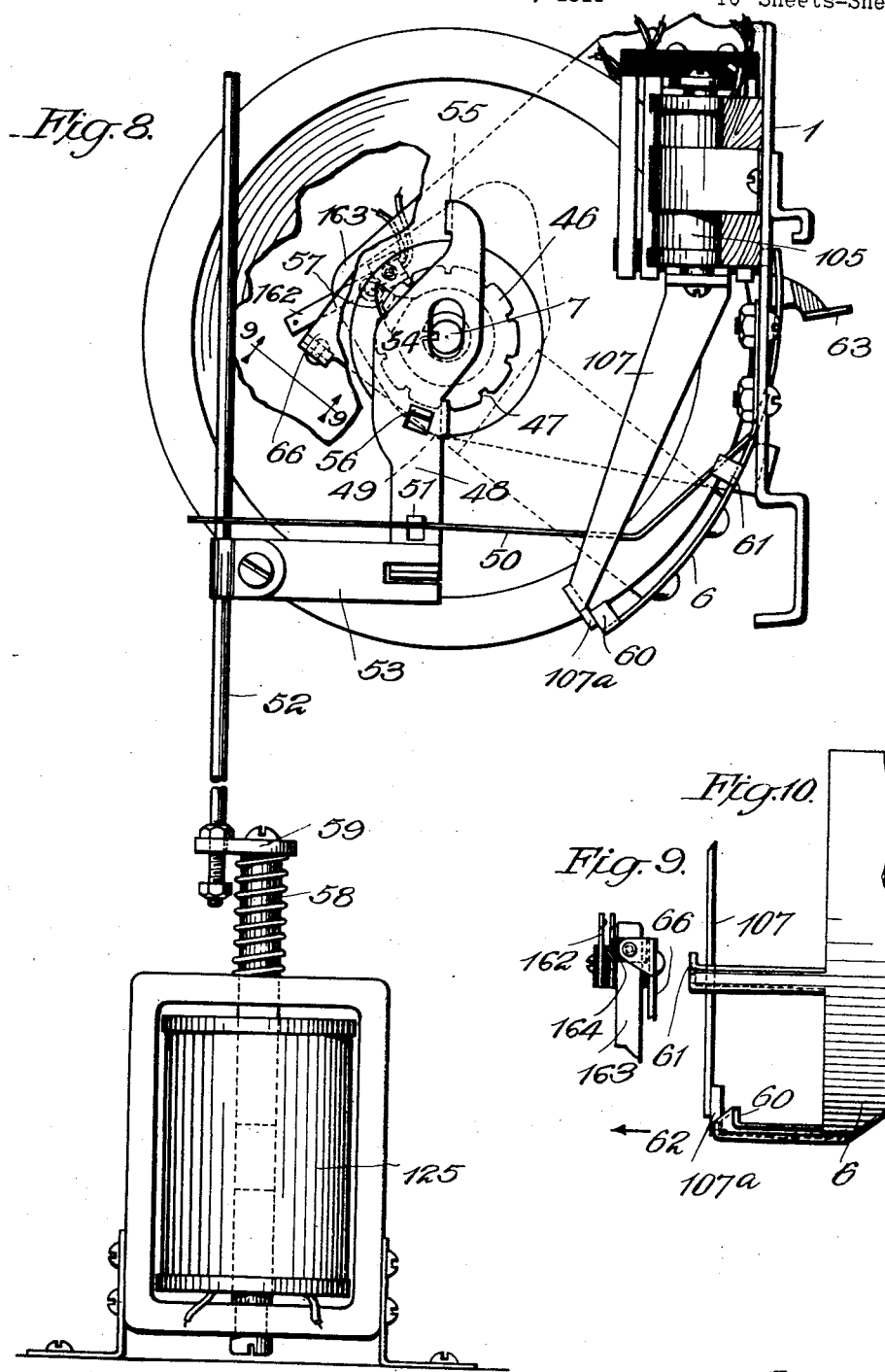

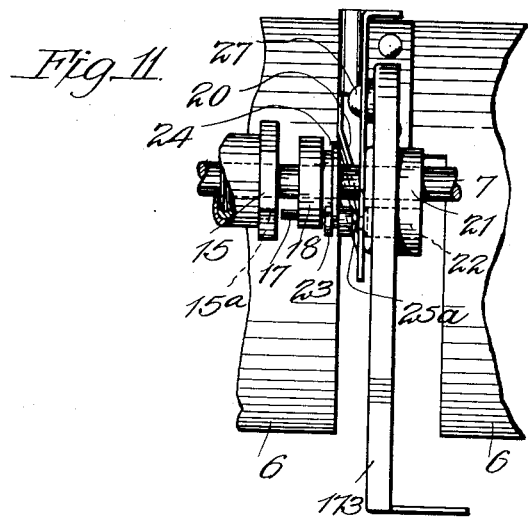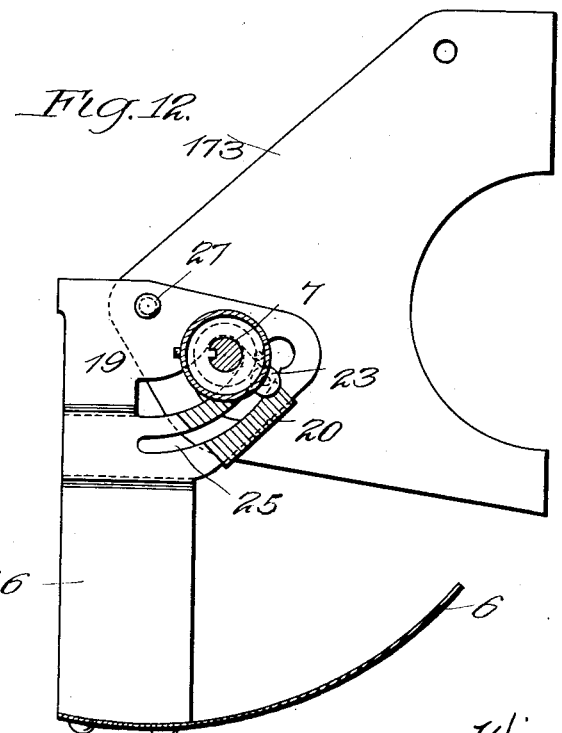

Nov. 4, 1924.

W. G. THOMAS

REGISTER AND INDICATOR

Filed Nov. 7, 1919

Patented Nov. 4, 1924.

1,514,353

UNITED STATES PATENT OFFICE.

WINTHROP G. THOMAS, OF BLUE HILL, MAINE, ASSIGNOR TO BATAVIA SERVICE CORPORATION, OF NEW YORK, N. Y., A CORPORATION OF NEW YORK.

REGISTER AND INDICATOR.

Application filed November 7, 1919. Serial No. 336,329.

*To all whom it may concern:*

Be it known that I, WINTHROP G. THOMAS, a citizen of the United States, and a resident of Blue Hill, Hancock County, State of Maine, have invented certain new and useful Improvements in Registers and Indicators, of which the following is a description.

My invention relates to the art of registers and indicators, and has as its principal object the provision of means whereby an operator at a given point may control the position of and indications given by a plurality of registers or indicators.

A second object of my invention is to provide means whereby a single operator may post quotations for a plurality of articles, such as stocks.

A third object of my invention is to provide means whereby a remote controlled quotation board may indicate correctly the current, high and low prices of a number of objects, such as stocks.

The novel features of my invention are pointed out with particularity in the appended claims. The invention itself, however, with further objects and advantages, will best be understood from the following description, taken in connection with the accompanying drawings, in which—

Fig. 1 is an elevation of a portion of a stock quotation board made according to my invention, illustrating the registers for three different stocks as these registers appear to the observer under three different conditions to be explained below.

Figs. 2, $2^A$ and $2^B$ are horizontal sectional views of adjoining portions of one of the register mechanisms shown in Fig. 1, parts being broken away and parts being in plan for purposes of illustration. The relative position of the plane on which the sectioned portions of Figs. 2, $2^A$ and $2^B$ are cut is indicated by line 2—2 on Fig. 3.

Fig. 3 is a view taken from the right of Fig. $2^B$.

Fig. 5 is a sectional view taken on the line 5—5 of Fig. 6.

Fig. 6 is a sectional view taken on the lines 6—6 of Figs. 4 and 5.

Fig. $6^A$ is a detail in sectional elevation of a selecting key and associated parts.

Figure 1:
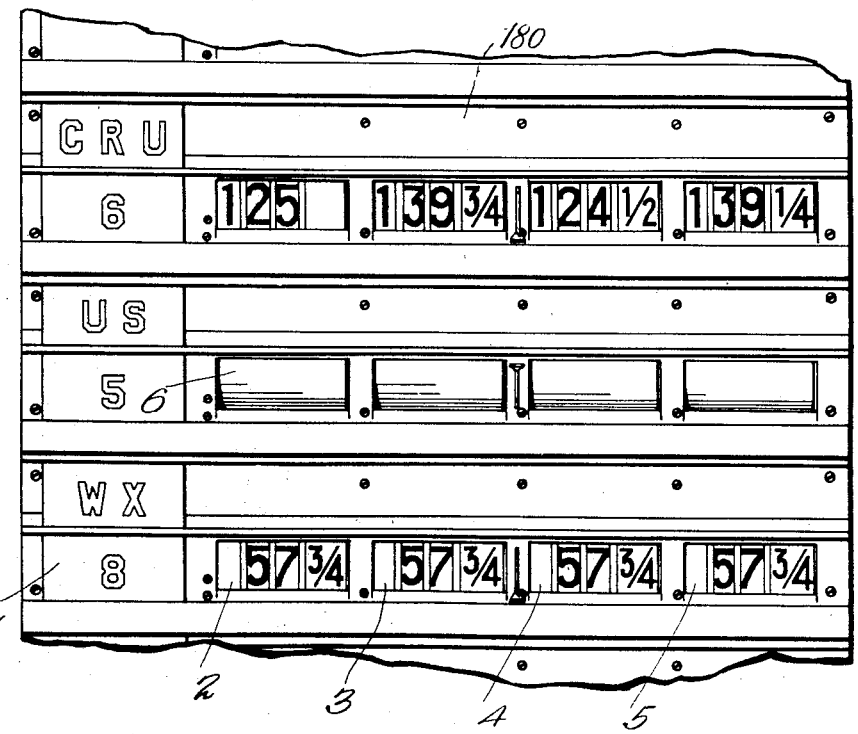
Figure 2:
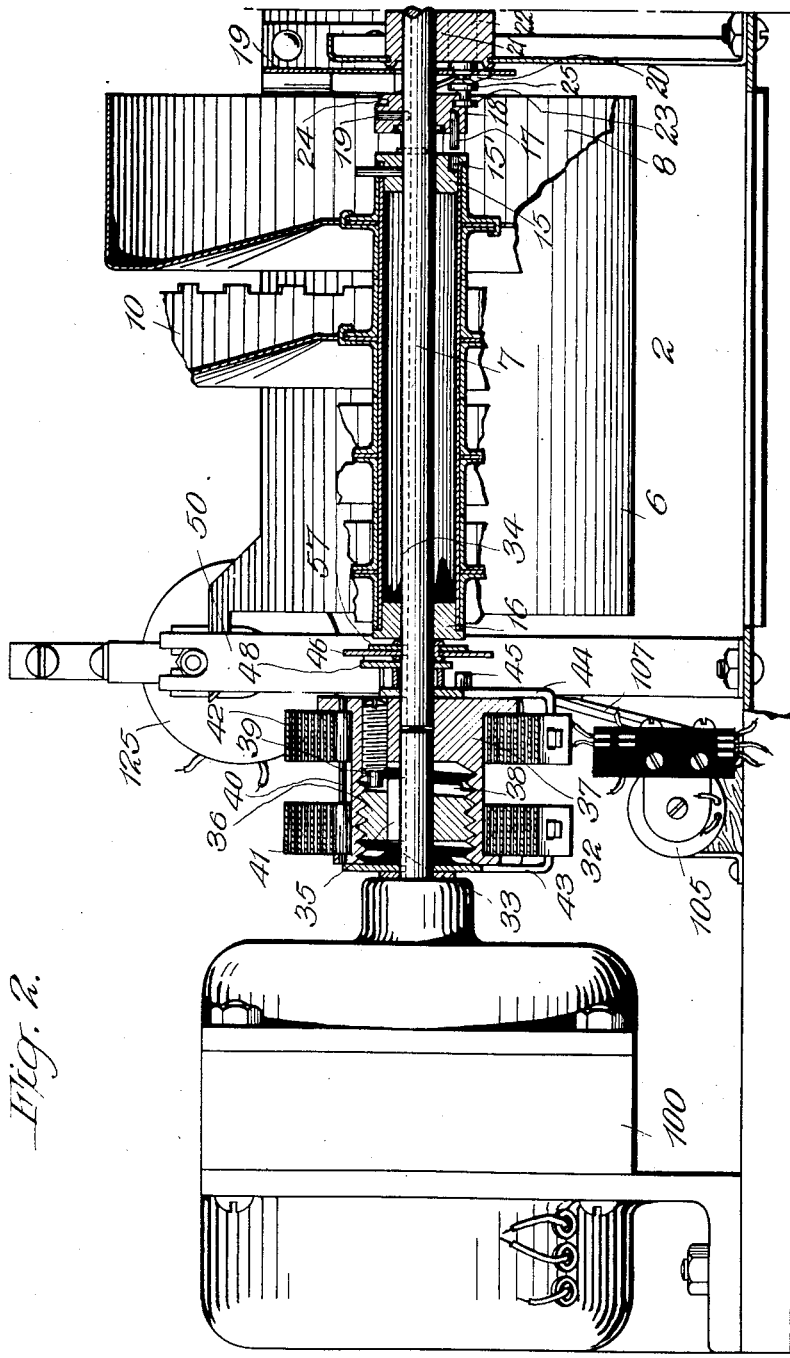

Fig. 7 is a diagrammatic view illustrating electrical circuits associated with the mechanism appearing in Figs. 1, 2, $2^A$, $2^B$, 4, 5, 6 and 8.

Fig. 8 is an elevational view, parts being broken away to show the locking mechanism of a register such as is illustrated in Figs. 2, $2^A$, $2^B$ and 3, looking in the opposite direction from Fig. 3, the motor, motor shaft, and spring coupling, appearing in Fig. 2, being removed.

Fig. 9 is a detail view of one of the pairs of contacts for controlling the "opening" lamp, this figure being taken when looking in the direction of the arrows at the ends of line 9—9 on Fig. 8.

Fig. 10 is a detail view of the catches controlling the opening movement of the shutter.

Fig. 11 is a detail view in plan illustrating one of the register clutches and the operating mechanism therefor.

Fig. 12 is a detail sectional view of the parts shown in Fig. 11.

Figure 13:
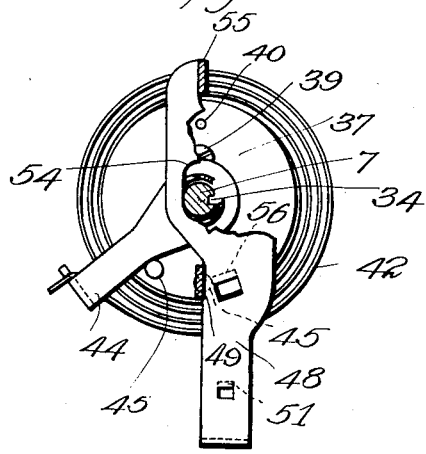

Fig. 13 is a detail view, parts being broken away, of the spring coupling and locking member of a unit looking in the opposite direction from Fig. 8.

Figure 14:
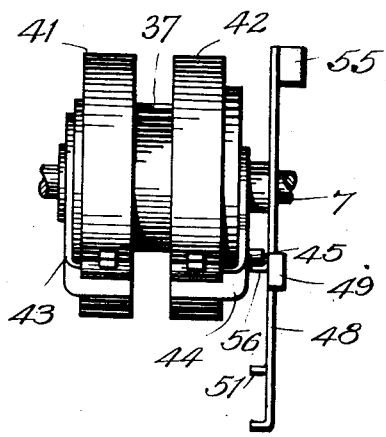

Fig. 14 is a detail elevational view of the parts shown in Fig. 13 looking in a direction 90 degrees from Fig. 13.

Referring to the drawings more in detail, each complete apparatus according to my invention includes one or more panels such as shown in Fig. 1, which may be mounted on hinges. A panel comprises a plurality of indicator mechanisms or units, such as 1, each of which preferably comprises a plurality of individual registers. The individual indicator mechanisms are illustrated as associated with individual stocks, the names of the stocks being indicated by appropriate abbreviations, and the dividend returns being indicated by figures immediately beneath the abbreviations. Each indicator mechanism, as illustrated, comprises four individual registers, the dials of which are visible through as many windows in the unit 1. In Fig. 1 these groups of register dials are indicated on the lowermost set of registers, as 2, 3, 4 and 5 respectively, beginning at the left of the figure, the registers in the same vertical row as register marked 2, indicating the opening price; those in the vertical row of register marked 3 indicating the highest price; those in the vertical row of register marked 4 indicating the lowest price, and those in the vertical row of the register marked 5 indicating the latest or current quotation. When designed for stock quotations, each register preferably includes four dials so that quotations in three digits and a fraction can be shown thereon. The three horizontal sets of registers shown in Fig. 1 are illustrated as they appear under three different typical conditions. The uppermost set, marked C R U, has a different quotation on each register, and the quotations differ by considerable amounts, indicating that the stock has been very active. The registers in the intermediate position, marked U S, have not been operated during the business day in question, the register dials being covered by the associated shutter such as 6. The registers in the lowermost row all show the same quotation, indicating that only one transaction in the stock W X has occurred during the business day in question, so that the opening, high, low, and last quotations are all the same.

The indicator mechanisms are duplicates, the preferred construction being illustrated in Figs. 2, 2$^A$ and 2$^B$. Each indicator mechanism comprises a central shaft 7 mounted in suitable bearings, having four sets of registers 2, 3, 4 and 5 thereon. The register 5, on which the current quotations appear, comprises a fraction dial such as 8, which is keyed to shaft 7 by suitable means, such as pin 9. Fractions appear on dial 8, running from one-eighth to seven-eights, the dials in Fig. 2$^B$ being viewed from above when in the same position as in Fig. 1, in which the quotation 57¾ appears in the window. Associated with dial 8 in register 5 are three digit dials, such as 10, which are revolubly mounted on the sleeve 11 which is free to turn on shaft 7. Intermediate each two adjacent dials, such as 8 and 10 is a novel carrying intermittently acting mechanism operating on the principle of the Geneva movement. The use of my novel carrying mechanism permits me to use simple sheet metal stampings for the numeral wheels while also keeping the wheels of the carrying mechanisms of small size relatively to the dial wheels. The carrying mechanism for each register, such as 2 or 5, comprises three toothed wheels, such as 12, which are pinned together as indicated at 12$^A$ and revolve on shaft 12$^B$. The right hand wheel of a given carrying mechanism, as viewed in Fig. 2$^B$, has four teeth, 13, thereon, each of which has one rounded surface, 13$^A$, which is designed to contact with the surface of the right numeral dial, these surfaces being arranged in pairs facing each other and normally locking wheels 12 and the left numeral dial, such as 10. Teeth 13 also co-operate with holes, such as 13$^B$, in the right hand numeral dial. The middle and left wheels of each carrying mechanism have six teeth, such as 14 and 14$^A$, respectively, thereon, the teeth 14 of each middle wheel co-operating with three stuck up projections, such as 14$^B$, which extend outwardly from the left edge of the right hand numeral wheel and the teeth 14$^A$ of the left hand wheel 12 co-operating with projections such as 14$^C$ formed in the right hand edge of the left-hand numeral wheel by cutting notches therein. Teeth 14 and 14$^A$ are in axial alinement and one of each lies normally radially to dial 10, radial teeth 14$^A$ locking dial 10.

In operation, the wheels 12 are normally locked by the engagement of teeth 13$^A$ with the surface of the right-hand dial, the teeth 14$^A$ and 14$^C$ preventing the left dial from turning. The right dial is free to turn, however, and as it completes a revolution the teeth 14$^B$ thereon strike the teeth 14 of the central wheel 12. At the time the teeth 14 and 14$^B$ contact one of the holes 13$^D$ in the cylindrical surface of the right hand dial is presented under one of the teeth 13$^A$, thus unlocking the carrying mechanism, and the three wheels 12 of the set are then turned by the action of 14$^B$ on 14, the teeth 14$^A$ of the left wheel 12 acting on the teeth 14$^C$ to turn the left dial or numeral wheel. The teeth 14$^B$ are provided on only one tenth the circumference of the right hand dial while the teeth 14$^C$ extend around the entire circumference of the left hand dial. The right hand wheel 12 of the set is revolved 180° so that the rounded surfaces 13$^A$ of the other pair of teeth 13 now contact with the numeral dial, surfaces 13$^A$ being arranged in opposing pairs for this purpose. Teeth 13 have also straight faces 13$^C$, one of which co-operates with one of the two holes 13$^B$ in each operation of a given mechanism, the first tooth to enter a hole 13$^B$ assisting in turning the wheels 12 so that a second tooth 13 will enter the second hole 13$^B$. It will be seen that the teeth of wheels 12 are not cut below their pitch surfaces. Moreover, with my form of mechanism, wheels 12 as well as the dials 8 and 10 may be stamped out of sheet metal. Except for the advantage of making them from thin sheets, wheels having teeth 14 and 14$^A$, respectively, might be combined into one. It will be seen from the foregoing description that the carrying mechanism of register 5 operates to turn the dial to the left of a given one under consideration an angular distance equal to that between two successive digits when the dial at the right of the given one passes to the unit position from a lower one, or from the unit position to a lower one. The dial 8 in Fig. 2ᴮ being keyed to shaft 7, the dials of register 5 follow and indicate the movements of shaft 7 in both directions.

Any convenient means, such as are commonly used in registers and calculators (not shown), may be used for preventing the overrunning of the fraction dials, such as 8, when operated in one direction or the other by mechanism hereinafter described.

The registers, such as 2, 3 and 4, are constructed similarly to register 5 so far as the dials, carrying mechanism, and prevention of over-running are concerned, but differ from register 5 in the means for operating them from shaft 7. Each of registers 2, 3 and 4 comprises three digit dials such as 10, and a fraction dial, such as 8, which are revolubly mounted on a sleeve 28 supported by bushings such as 15 and 16 from shaft 7, the bushings 15 and 16 being adapted to turn on shaft 7 unless restrained, the fraction dials 8 of these three registers being pinned to bushings 15. Bushings 15 have recesses 15' therein adapted to receive pins, such as 17, mounted on clutch blocks 18, whenever the recesses 15' and pins 17 are in axial alinement. Blocks 18 are splined on shaft 7, the blocks having pins such as 19 therein, which extend into a straight slot in the shaft. Consequently, the blocks 18 are always in the same angular position with respect to the shaft, and the bushings 15 and their fraction dials can be clutched to the shaft whenever the fraction dials are turned to a certain position with respect to the shaft. I prefer to control the clutching and unclutching of the fraction dials by means associated with the shutters 6, previously mentioned. The shutter is shown as swung from the pivots such as 27, (Fig. 3) by means of sheet metal hangers, such as 19, having arms 66 to which the shutter is attached (Figs. 3 and 12), and portions of hangers 19 are inclined to the plane perpendicular to the shaft 7, forming cams such as 20 (see Figs. 11 and 12). The shaft 7 has bearing blocks, such as 21, and blocks 21 have apertures therein parallel to shaft 7 in which are slidably mounted spools, such as 22. These spools have heads such as 23 which engage in peripheral grooves such as 24, in blocks 18, whereby the blocks may be moved on shaft 7 by movements of spools 22 while permitting rotation of the blocks. Now cam plates 20 lie intermediate the bearing blocks 21 and clutch blocks 18 and spools 22 extend through slots such as 25 in the cams, the spools being grooved at the slots 25 to form shoulders such as 25ᵃ, bearing against the cam surfaces adjacent the slot, whereby, when the shutter 6 is swung on its pivots, the fraction dials 8 of registers 2, 3 and 4, may be released from or clutched to the shaft 7.

When used for quotation purposes, I operate the device so that the clutch pins 17 are all in the corresponding recesses 15' at the start of business for each day, the shutter then being closed. As the first quotation is posted in a given indicating mechanism, the shutter drops out of the windows and the opening price appears the same on all the registers, the arrangement by which this operation is obtained being described in detail hereinbelow. The first movement of the shutter, however, is not sufficient to withdraw the clutch pins 7 from recesses 15', and before the second quotation is posted on this mechanism the fraction dials of registers 2, 3 and 4 should be released so that the register 2 shall stand at the opening price and that registers 3 and 4 may turn in the direction necessary to register quotations higher and lower, respectively, than the opening. I accomplish this result by arranging that the shutter 6 shall drop from the position shown in Fig. 1 to that shown in Figs. 2, 11 and 12 in two steps, being caught by a finger at the end of its first step and the finger tripped by the operator after the opening price appears on the register by means hereinafter described.

Registers 3 and 4, for indicating the high and low prices respectively, have means for operating them from shaft 7 in addition to the clutch means previously described. Such additional means include interiorly threaded sleeves such as 28 on which the dials for registers 3 and 4 are mounted. Splined on shaft 7 are exteriorly threaded nuts, such as 29, having threaded engagement with the sleeves 28. The nut 29 for register 3 is assembled so that when fraction dial 8 of register 3 is in the same angular position as the dial 8 of register 5, the latter being pinned to shaft 7, it (nut 29) is in contact with bushing 15 at the right of the sleeve 28, and any subsequent movement of the shaft 7 such as turns the dials of register 5 to a higher quotation than the opening, forces the nut 29 against the end bushing, thereby locking the fraction dial 8 to the shaft turning register 3 to indicate the high quotation of register 5, the latter always indicating the current price. Any movement of shaft 7 turning register 5 to indicate a lower price than the opening or the high previously set on register 3 merely backs the nut 29 of register 3 away from its end bushing 15, thus interrupting the driving connection between register 3 and shaft 7, and permitting the register to stand at the point at which it indicates the highest quotation to which register 5 has been turned. In a similar way, register 4, for indicating the lowest price, is turned in the desired direction whenever register 5 is turned to show a lower price by the contact of nut 29 with end bushing 16, bushing 16 being at the left end of the sleeve 28 associated with register 4. In order to insure exactitude in the points at which nuts 29 come into driving engagement with the end bushings, I prefer to provide the driving faces of the nuts with shoulders, such as 30, of the axial thickness of the pitch of the threads on the nut, and to provide corresponding shoulders 31 on the bushings 15 and 16.

While I have devised the mechanisms previously described with particular reference to its use in banks and its operation from an operator's station somewhat removed from the bank of indicators, it is evident that uses may be found for individual indicator mechanisms and also that uses may be found for the novel clutch and driving arrangements entirely apart from the part of indicators or registers.

I have shown and described herein an electrical system for operating shafts 7 from the operator's position or central station, but I do not restrict myself to electrical methods or apparatus for this purpose.

The particular method and apparatus now preferred by me for selecting and operating my indicators comprises electric motors, such as 100, one for each indicator shaft, the motor shafts being in alinement with shafts 7 and coupled thereto by suitable means. I prefer that the shafts 7 be locked until the operating means or motor comes to rest, and consequently provide spring couplings, such as 32, intermediate the motor shafts and shafts 7. Each coupling 32 permits the motor shaft to turn in either direction from the neutral or positions in which shaft 7 is locked and thereafter turns shaft 7 to the same angular position as the motor shaft when the shaft 7 is temporarily unlocked. The motor shaft has a slot 33 therein which stands normally in alinement with the slot 34 in shaft 7, and slot 33 has a key 35 therein whereby a nut 36 is splined on the motor shaft. Nut 36 is in threaded engagement with the interior of a drum 37 and has a radial shoulder 38 thereon which stands in engagement with a pin 39 carried by the solid head drum 37, when slots 33 and 34 are in alinement, the engagement between pin 39 and shoulder 38 transmitting the turning movement of the motor shaft direct to drum 37 when the rotation of the motor shaft is clock-wise as viewed from the left of Fig. 2. It will be seen that, as shown, the clock-wise motion of the motor shaft is that necessary to increase the reading on the dials of the current register 5. Now drum 37 carries a pin 40 on its external flanges and the inner ends of springs 41 and 42 are fixed to pin 40 and coiled about drum 37 in the same direction (also see Figs. 13 and 14). The outer ends of springs 41 and 42 are fixed to arms 43 and 44 respectively, arm 43 being keyed into slot 33 and arm 44 being keyed into slot 34 so that arms 43 and 44 turn with the motor shaft and shaft 7 respectively. If now the motor shaft is turned by the motor in the clockwise direction, the shaft 7 remaining locked, arm 43 turns with the motor shaft as well as nut 36 and drum 37. Consequently, both ends of spring 41 turn at the same rate, and this spring is unaffected. However, arm 44, being fixed to shaft 7, retains the outer end of spring 42, and this spring is wound by the movement of the drum 37. If, now, the motor shaft stops and the shaft 7 is released, the shaft 7 is swung around by spring 42 into the same relative position with respect to the motor shaft at the beginning of the operation where it stops owing to the contact of arm 44 with pin 45 (see Fig. 13) which projects from the head of the drum and which lies in contact with the arm 44 when the motor shaft and shaft 7 are in the same angular position. Both shafts have now altered their position in space. If now the motor shaft be turned counter-clockwise, when viewed from the left of Fig. 2, the shaft 7 being locked again, the nut 36 will back away from pin 39, the drum 37 being held from turning by pin 45. Since the outer end of spring 41 is now turned by arm 43 and the inner end is held by the drum, this spring is now wound. If, then, the motor stops and the shaft 7 is unlocked, spring 41 swings shaft 7 into the same angular position as the motor shaft. Springs 41 and 42 are under an initial tension so that they have sufficient force to swing the shaft 7 quickly even though the movement of the motor shaft has been small.

Each shaft, such as 7, has a locking arrangement comprising a notched disk 46 best shown in Fig. 8, disk 46 being fixed to shaft 7. Disk 46 has ten notches such as 47 therein, only eight of which are utilized when the fraction dials are marked in eighths, but I have provided ten notches 47 in order that my arrangements need be disturbed as little as possible in case the Stock Exchange should adopt the practice of making quotations in tenths. Associated with disk 46 is a stop and locking member in the form of a plate 48 which has a locking finger 49 thereon which normally engages in a notch 47 to lock the disk 46 and shaft 7. I provide a leaf spring 50 to maintain plate 48 normally in the locking position, plate 48 having a lug 51 thereon for engaging spring 50. For withdrawing plate 48 to unlock shaft 7, I provide a rod 52, which may be operated by any suitable means, rod 52 having one or more clips, such as 53, thereon for engaging the plates 48, rod 52 preferably extending the entire height of a given bank of indicators and operating all the locking plates in the bank. This is permissible when, as in the arrangement herein described, I operate on one indicating mechanism at a time. I prefer to operate rod 52 by means of a solenoid relay 125. The movement of plate 48 is limited by the dimensions of the slot 54 in plate 48, the shaft 7 passing through the slot and also serving as a guide by contacting with the edges of slot 54. At its upper end, plate 48 carries an escapement finger 55 which contacts with a dog 57 fixed on shaft 7 under certain conditions, when the plate 48 is drawn down, and prevents the motor from turning the shaft further than desired in the up direction when the shaft is unlocked. Plate 48 also carries a stop finger 56 which is so placed as to prevent, while shaft 7 is locked, the pin 45, (see Fig. 13) and consequently the motor shaft, from turning upward beyond the position in which the motor shaft would synchronize with shaft 7 (having slots 33 and 34 in alinement) when shaft 7 is at the seven-eighths position.

Behind the notched disk 46 as seen in Fig. 8 and immediately to the right of disk 46 as viewed in Fig. 2, is a dog 57 which projects radially beyond disk 46 sufficiently to contact with escapement finger 55 when plate 48 has been drawn down by rod 52 in case the motor 100 is turning shaft 7 in the up or clockwise direction as viewed in Fig. 8. When the relay 125 releases the rod 52 and spring 50 lifts the plate 48, catch 49 slips into the next notch 47 that presents itself after the dog 57 is released. The relative position of the parts is such that the shaft 7 is then held so that a whole number is displayed on current register 5.

The lock relay 125 has a plunger 58 at the upper end of which is fixed an arm 59 having a lost motion connection with the lower end of rod 52 in order that plunger 58 may develop momentum to assist in the operation of the locking mechanisms of the bank indicators.

At the left end of each indicator mechanism or set of registers, as viewed in Fig. 1, I place a unit relay 105 whose principal functions are described more in detail hereinbelow in connection with the circuits of motor 100 and the operator's station. I, however, make use of relays 105 to control the movement of the shutters 6. Each relay 105 has its armature 106 extended into an arm 107 (see Figs. 8 and 10) at the lower end of which is a catch finger 107ª which cooperates with two escapement fingers 60 and 61 at the ends of arms fixed to shutter 6, as best shown in Fig. 10. The shutter appears in the same position in both Figs. 8 and 10, the shutter being raised as far as it can go, and relay 105 being without current. Upon the first operation of relay 105 for the day arm 107 swings in the direction of the arrow 62 just sufficient to bring catch 107ª in the path of finger 61. Shutter 6 accordingly falls into an intermediate position in which it is held so long as the current remains on relay 105. In this position of the shutter 6, the cams 20 have not yet begun to act to withdrawn clutch pins 17 to unlock registers 2, 3 and 4 from shaft 7, the registers all being compelled to give the same indication as previously described for the initial or opening quotation. When the operator cuts off the current to relay 105, finger 107ª is allowed to drop out from the path of finger 61, permitting the shutter to drop the entire distance into the lowermost position shown in Fig. 12. In passing from the intermediate to the lowermost position, shutter 6 causes plate cams 20 to withdraw the pins 17 and unlock registers 2, 3 and 4 from shaft 7, registers 3 and 4 being thereafter operated by special clutches at the limits of the movement of shaft 7, as previously mentioned. Shutter 6 is drawn up to the position shown in Fig. 8 by means of a bent lever 63 (see Figs. 2ᴬ, 3 and 8), which is pivoted at 64, and the inner end of which is attached to a spring 65 which connects lever 63 to one of the hanger arms such as 66 by which shutter 6 is suspended from pivot 27. Spring 65 is connected at one side of pivot 27, whereby the shutter 6 is lifted as the lever 63 is lifted, the spring 65 preventing damage to the shutter 6 and parts associated therewith in case anything should jam during the closing movement. As illustrated in Fig. 10, the catch 60 is inclined to its plane of revolution so that it may act as a cam to push finger 107ª to one side as the shutter is being closed, there being no current in relay 105 when the shutter is put up.

For operating the motors, such as 100, of the indicator shafts, I provide an electrical system controlled by an operator whose station may be at any convenient place with reference to the individual indicators. The system selected by me for this purpose is illustrated diagrammatically in Fig. 7, in which are indicated two such motors, these being shown as three-phase machines having stator windings such as 101.

One end of each stator coil connects to one of the three primary supply wires, such as 102, shown in heavy lines in the drawing, which are fed with three phase current by suitable means such as the inverted rotary converter 103. The other end of each such stator coil 101 is brought out and run to one of three short circuiting contacts such as 104, which stand open while the motor is stationary. A relay such as 105, having an armature 106, is provided for each motor, said armature carrying a short circuiting block 107 cooperating with contacts 104 to close the circuits through fields or stators 101. The indicator or panel motors have phase wound armatures or rotors such as 108, the leads from which are extended through the usual slip rings and brushes, and I provide means whereby at least two of the leads from any such motor are interrupted so long as the relay armature is unattracted. As shown, two of these leads go to stationary contacts, such as 109, the cooperating movable contacts for which are carried also by the armature 106. By this arrangement it results that the rotor and stator circuits of each panel motor are without current so long as its relay 105 is not operated. When said relay operates to close the stator of its motor, it also closes the rotor contacts and extends the rotor circuit into connection with the secondary trunk lines designated by 110, these trunks being shown in the drawing by lines somewhat less heavy than the primary supply lines 102.

The secondary trunk lines extend to the operator's or control station and are there connected to conductors such as 111, which terminate at their one ends in movable contacts such as 112, normally short circuited by the conducting block 113. At the operator's or control station is a machine 114 of the same type as the indicator motors whose stator windings 115 are also connected to the primary supply lines 102, but which has its stator winding permanently closed. The rotor 116 of machine 114 has leads brought out to contacts such as 117 which are normally open, but which when closed serve to connect rotor 116 with secondary trunks 110, so that machine 114 may be thrown into synchronism with any one of the indicator motors at the time the latter is also connected to said trunks.

At the said operator's or control station, I provide means whereby the operator may select any one of the indicators on the quotation board which he may desire to operate and also means whereby the motor 100 of a selected indicator may be turned to set the indicator at the desired point, the said setting means including the machine 114, previously referred to, means whereby this machine is brought into synchronism with the selected indicator motor and means whereby machine 114 may be positioned to turn the indicator motor as desired.

The preferred operator controlled means for selecting a required indicator motor comprises a bank of keys such as 118 (see Figs. 4 and 6), each of which is marked to indicate the stock or article whose quotation indicator is associated therewith. Each key, such as 118, is normally held up by a spring 118' between the head of the key and the board 166 in which the keys are mounted.

Figure 4:
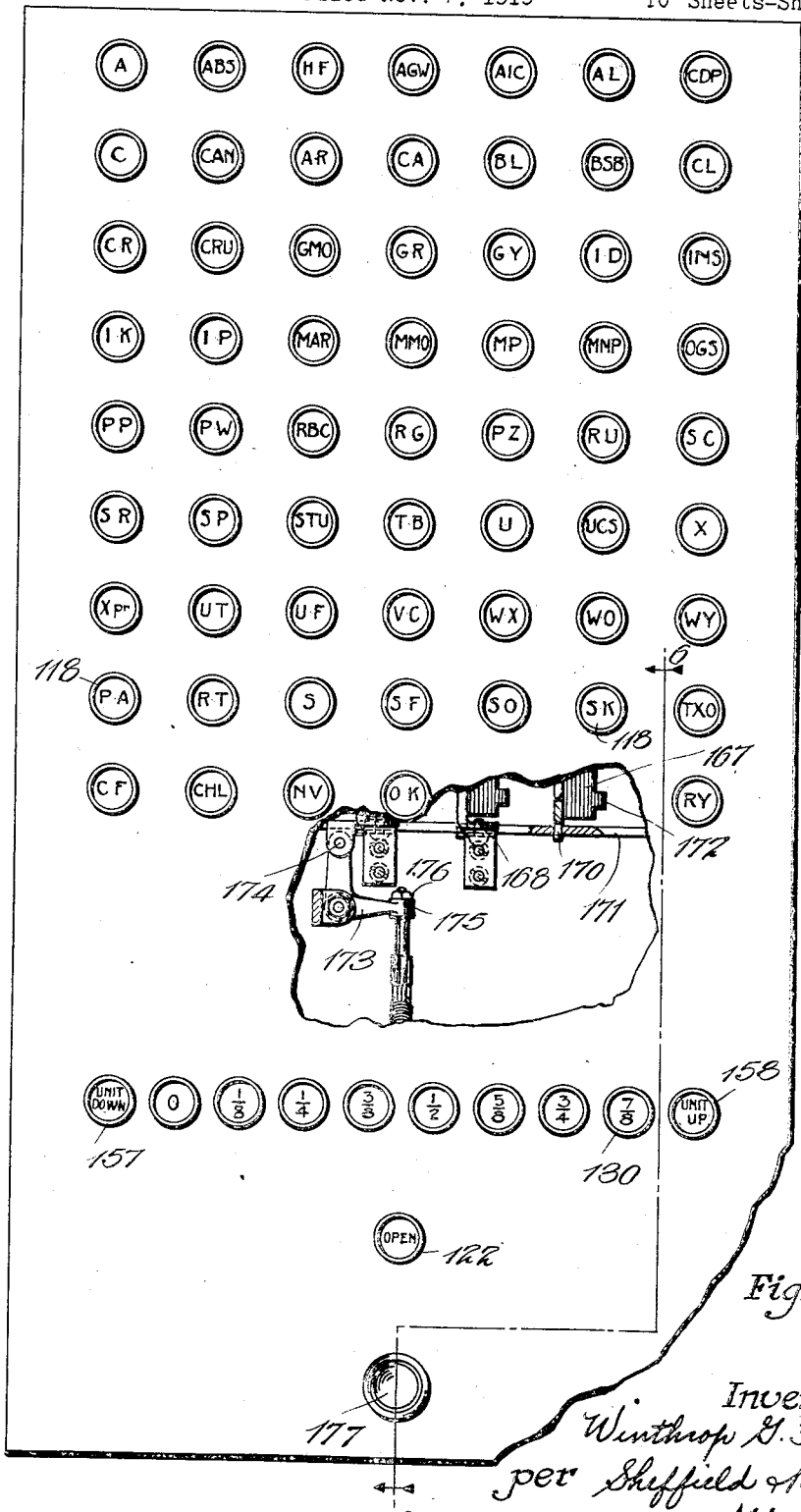
Fig. 4 is a plan view, partly broken away, of a key-board for use in selecting the individual register mechanisms and operating the same as desired.

The keys extend beneath the board and have apertures 147 therein near their lower ends whose purpose will presently appear. Beneath each row of keys is a strip such as 167 hinged to board 166 as at 168, the lower end of strip 167 being inclined toward the lower ends of its row of keys, the ends of the keys being also inclined toward the strip as shown at 169, (Fig. 6ᴬ). Each strip 167 has at one end a projection 170 whereby it is interlocked with a plate 171 which extends at right angles to strip 167. (Figs. 4 and 6.) Each strip 167 has a series of locking fingers 172 at its lower edge, one for each key 118, and as such a key is pressed down its end 169 presses against and rocks strip 167 around its pivots until the finger 172 slips into apertures 147 and locks the key. In so doing a given key rocks all strips 167 owing to their connection through plate 171 and thus unlocks any previously operated key 118.

In the following description the keys, such as 118 are referred to as stock keys. If a stock key is operated it closes the corresponding pair of contacts, such as 119, shown in the circuit diagram, and this closes a control circuit leading from ground at 120 through battery B, line 121, "Opening" switch 122, resistance 123, stock contacts 119, lead such as 124, motor relay 105, lock relay 125, to ground at 126. Owing to the resistance 123, the lock relay 125 is not as yet operated. The operation of motor relay 105 closes the stator and rotor circuits of selected motor 100 and it will be seen that the rotor (108) is thereby short circuited so that it runs as an induction motor until stopped at a predetermined point by means of the contact of pin 45 with stop finger 56 as illustrated by the dotted line position of these parts in Fig. 13. The station machine 114, normally stands at the same angular position as that to which the indicator motors run as induction motors, its shaft having a spring 151 which turns its armature into this desired position as determined by stop pin 152 in the path of toothed arm 136, geared to the armature shaft of machine 114 (as shown in Figs. 5 and 6). Consequently, if the rotor 108 of the indicator motor is now disconnected from the short circuiting bar or block 113, and connected to rotor 116 through contacts 117, the two machines will be in synchronism and the rotor 108 of the indicator motor will turn through the same electrical angle as that through which the machine 114 may be turned. I prefer to limit the movement of machine 114 by stops 152 and 153 in the path of arm 136 so that the indicator motor may be turned not more than 360 mechanical degrees at any one operation of the central station machine 114.

The means for bringing the machines into synchronism comprises the key-board relay 129 and the means for operating the same. After selecting the desired indicator in the manner just mentioned, the operator manipulates one of the motor operating keys such as 130. Hereafter, motor operating keys 130 are referred to as price keys. As shown, these keys are normally held up by springs such as 131, their lower ends resting against a contact plate 132 which is grounded as indicated at 133 in the diagram. Plate 132 is spring supported from a bar 134 which carries one or more contacts, such as 135, insulated therefrom and connected through lead 136 to the winding of the station relay 129 and thence through lead 121 to battery B and ground. Consequently, the first result of pushing down on one of the price keys 130 is to force plate 132 against contacts 135, resulting in the operation of station relay 129, throwing machine 114 into synchronism with the selected motor 100. Further pressure on key 130 forces the plate 134 downwardly carrying with it the rack arm 136 on which it is mounted and thereby turning shaft of machine 114, and thereby also turning the motor 100 through an equal number of electrical degrees due to the exchange of current between the rotor 116 of machine 114 and rotor 108 of motor 100.

As key 130 moves downwardly, its lower inclined end 130' pushes against the cooperating projecting latch finger 137 on the lower end of locking strip 138, swinging the latter counterclockwise around its pivot 139 when viewed as in Fig. 6. Now strip 138 carries a block 140 of insulating material which normally rests against one of a pair of contacts 141 holding them together. Referring to Fig. 7, it will be seen that contacts 141 are in series with contacts 144 in a circuit which shunts the resistance 123. It will be seen that the swinging of strip 138 by key 130, above mentioned, permits the contacts 141 to open during the downward movement of price key 130, and hence the shunt around resistance 123 is not completed during this downward movement although contact 144 is closed during this period by relay 129. However, when key 130 has moved a certain predetermined distance the aperture 147 in the key 130 comes opposite to finger 137 at the lower end of strip 138, and this finger is immediately thrust into the aperture 147 by the action of spring 149 which acts to throw strip 138 to the left when viewed as in Fig. 6, spring 149 being attached to a rod 150 pivoted to strip 138. The movement of key 130 is arrested by its engagement with finger 137 just described, and the key 130 remains locked temporarily in this position determined by the position of aperture 147 in the key 130. But as the finger 137 slips into aperture 147, block 140 on strip 138 closes contacts 141, so that the shunt around resistance 123 comprising point 165, contact 144, and contact 141 is now complete, owing to the previous closing of contact 144 by relay 129 as described.

Since each price key 130 rocks strip 138 as the key is pressed down, it follows that any of these keys, when operated, unlocks any previously operated price key. Now, as previously mentioned, each stock key when operated unlocks any other stock key. I also provide means whereby any stock key, when operated, unlocks not only other stock keys but also any price key which has been previously set. This means comprises a bell lever 173 (Figs. 4 and 6) pivotally connected to plate 171 at 174 and having a sleeve 175 at its other end through which extends the rod 150 connected to spring 149 and locking strip 138 for the price keys. As shown in Fig. 4, the parts are so arranged that the operation of any stock key causes the sleeve 175 of bell crank 173 to pull against nut 176 on the end of rod 150 and thus rocks the strip 138. However, the rod 150 has a loose fit in the sleeve 175, from which it results that the operation of one of the keys 130, 157 or 158 does not unlock a previously operated stock key. Consequently, if two or more successive quotations relate to the same stock, it is not necessary to operate the given stock key a second time. As appears in Fig. 6ᴬ, the lower ends of the stock keys 118 and strips 167 are inclined toward each other to provide the necessary throw of the strip 167 with the resultant throw of strip 171 and bell lever 173 to effect these releasing operations.

The shunting of resistance 123 permits additional current to flow to relay 125 to operate it with results previously explained. It will be understood that the price keys 130 have their apertures 147 in different relative positions so that the machine 114 may be operated by them to turn any indicator motor any desired amount at one operation. Since spring 151 tends to turn rotor 116 back to its original position, bar 134 is pressed upwardly, pressing plate 132 between 134 and key 130, so that contacts 135 are kept operative as long as the key 130 is locked down and current is maintained in relay 129. So long as this is the case, the rotors of machines 100 and 114 being in exact synchronism, there is a minimum of current taken from the line, since the two rotors are arranged to have their electromotive forces in opposition.

The "Open key" 122 has been previously referred to. This is only used immediately after the opening price in some stock has been posted. At this time, the registers for the given stock all indicate the same, the shutter 6 being held in its intermediate position by finger 107ª. It is then necessary to cut off the current to motor relay 105 to release the shutter and allow it to unlock the clutches for registers 2, 3 and 4 as previously described. Upon pushing on "Open key" 122, the circuit through relay 105 is broken and the shutter thereby released. Since a panel is designed for a considerable number of units I provide means to call the operator's attention to the fact that a given quotation is the opening one for any given stock. This means is a lamp 177 at the operator station, the circuit for which extends from the battery B through lead 178 and to ground through contacts such as 162 (see Figs. 7, 8 and 9), one of which contacts being closed only when the shutter 6 is in the intermediate position as indicated diagrammatically in Fig. 7. Consequently, lamp 177 lights when the first price of any particular stock has been posted and the operator then pushes his "Opening key" (122) to release the relay 105, this being done before posting any other quotation. Contacts 162 are supported from one of the bracket plates, such as 163, by which the shaft 7 is supported from the indicator plate 1, and I provide a contact maker 164 of insulating material which is supported from a hanger portion 66 associated with shutter 6 so that contacts 162 are closed only when the shutter is in intermediate position.

The preferred form and arrangement of relay 129 is shown in Figs. 5 and 6. This relay is mounted on a non-magnetic base such as 154 and has a pivoted armature 155 which carries the short circuiting bar 113 previously referred to. Supported by one pole of relay 129 is an insulating block 156 which carries spring conductors 111 to which the secondary trunks 110 are connected. Spring conductors 111 carry contacts 117' which co-operate with contacts 117 to connect conductors 111 and hence trunks 110 to the rotor 116 when the relay armature 155 is drawn down. When the armature 155 is up, bar 113 short circuits 111 as shown. Armature 155 also carries one of contacts 144 in the circuit for automatically shutting out resistance 123, these contacts closing when armature 155 is down.

In the specific arrangement herein described, there are eight keys 130 shown which are identical except as to the position of the apertures 147 therein, these being numbered from 0 to ⅞ in steps of ⅛. In the same row with keys 130 are keys 157 and 158 labeled $\frac{\text{Unit}}{\text{Down}}$ and $\frac{\text{Unit}}{\text{Up}}$ respectively. The operation of key 157 is somewhat similar to that just described for price keys 130, but it will be seen that there is no aperture in key 157 for the contact finger provided on strip 138, since I do not desire this key to lock down owing to the possible condition arising of this key being operated several times in succession in order to record a downward movement of more than one unit.

Consequently, contacts 141 will remain open while this key is down, and special means must be provided to shunt resistance 123 to operate unlocking or escapement relay 125. This means is a pair of normally open contacts 159 which shunt resistance 123 and which are closed at the lowest position of key 157 by finger 161 on this key. At this point key 157 has depressed plate 134 attached to gear arm 136 so that machine 114 has been rotated backwards 360° to the ⅞ point. I find too that contacts 159 can be conveniently mounted on an insulating block 160 carried on machine 114. The key 158 has no locking aperture and does not press against plate 132 or operate the machine 114 through arm 136 and the gear, but merely closes contacts 165. The desired stock key upon operation unlocks any of the keys, such as 130, which might be locked down in a manner previously described, thus permitting plate 132 to spring away from contacts 135 so opening the contacts of relay 129 by breaking its circuit and consequently cutting off machine 114 from rotor trunks 110 and short circuiting rotor 108 of the selected dial or indicating motor. The selected indicator motor immediately runs as an induction motor to the ⅞ position and is there held by the stop 56 on the locking plate 48 until the operation of key 158 shunts resistance 123 through contacts 165 and thus operates relay 125. The dial motor is then permitted by the escapement mechanism 55 and 57 to turn the dial or indicator shaft nearly to the next higher unit position. Upon releasing key 158 this shunt circuit is broken and the lock relay restored by its spring to the position shown in Fig. 8. Thereupon the dial shaft and its motor are permitted to turn the remainder of the distance to the unit position, the dial shaft being then locked in this position by the parts 49 and 47, the motor turning into contact with the stop at the ⅞ position. This operation can be repeated as often as desired. However, the circuit of relay 105 is still closed, so that the rotor of motor 100 is connected to trunk 110, and so is in position to be immediately thrown into synchronism with machine 114 and operated by key 130 if desired without again pressing the stock key.

It will be seen that the keys 130 are used when the new quotation is within the same unit as the previously posted price, but that keys 157 and 158 are used whenever it is desired to pass from one digit to another on the current register 5.

At the close of a business day, I place cards in the spaces such as 180 above the registers 3, 4 and 5, so as to show the high, low, and last quotations for each stock traded in that day. The registers are then turned by hand so that those for each stock all read the same as the last quotation and the shutters 6 are then closed, locking registers all to their shafts in alinement. Current is taken off the board and the apparatus will then be ready to proceed automatically upon the opening of business for the next day upon the restoration of the current.

The operation of my device is evident from the foregoing description, but is here summarized for convenience of reference. Upon pressing a stock key 118 a given stock is selected, operating the corresponding unit or motor relay 105. If it is an opening quotation in this stock the shutter 6 drops to the intermediate position, the lamp 177 being lighted. In the meantime motor 100 runs to the 7/8 position. The operator then posts the desired quotation by the use of price keys 130, 157 and 158, or such of them as may be necessary, in the manner previously described in connection with these keys, the registers of the given indicating mechanism all reading the same. The shutter being in the intermediate position, the opening lamp 177 remains lighted and the operator is thereby notified to push the opening key 122 to withdraw the clutch pins of registers 2, 3 and 4. Thereafter, register 2 stands at the opening price, while registers 3 and 4 are moved to show the highest and lowest points reached by register 5. The indicator shafts normally stand locked, but are unlocked at times as necessary to permit the indicator shaft to swing into the same angular position as its motor shaft. Each of keys 118 and 130 lock at the time they are operated. Keys 118 are unlocked by the operation of other stock keys, but not by the operation of price keys. Price keys 130 are unlocked by the operation of both price keys, stock keys and keys 157 and 158. The key-board machine 114 and the panel motors 100 are automatically synchronized from any position of the motors by arranging that the key-board machine 114 is turned automatically to a given position when released, and the motors 100 run automatically to the same position acting as induction motors. The key board machine and the selected motor are then thrown into synchronism and are turned together to the desired position by the price key. In the case of operating the Unit-up key 158, the synchronous operation is not required provided the price posted is a whole number. If it is not a whole number, the proper fraction is then obtained by operating the desired fractional price key 130. In case the Unit-down key 157 is operated, the current register 5 is set at the 7/8 position in the next lower unit than the one previously posted, and in case the new price includes a different fraction from 7/8, the desired price key 130 is operated after key 157.

I am aware that others have used indicating systems comprising two electrical machines designed to move in synchronism, and in which the machines are self-synchronizing when supplied only with alternating current if separated slightly less than 180 electrical degrees, but I believe I am the first to devise a system comprising machines adapted to operate in synchronism and in which synchronism may be attained automatically irrespective of the angular distance between the machines to be synchronized when supplied with alternating current only.

It will be understood that my complete invention consists in the combination of means for performing the functions herein described, and that I consider as within my invention any combinations comprising the electrical or mechanical equivalents of means herein described. It is evident, moreover, that parts of the apparatus herein described may be used without using the whole.

Having thus described my invention, I claim:

1. A display apparatus comprising in combination operator controlled means for indicating the current quotation of a given object, means for registering the initial quotation of said indicating means, means whereby said current quotation indicating and initial quotation registering means may be locked to move in unison, and means whereby said locking means may release said registering means to permit it to stand at the position taken by its after its initial movement irrespective of subsequent movements of said indicating means.

2. An indicating apparatus comprising, in combination, a plurality of registers having shaft portions connected to rotate in unison, clutches for holding certain of said registers rigid with their shaft portions when desired, a remotely controlled movable member, and connections between said movable member and said clutches whereby said registers are clutched to their shaft portions and released therefrom according to the position of said movable member.

3. An indicating apparatus comprising, in combination, a plurality of registers having shaft portions in alinement, clutches for holding said registers rigid with their shaft portions when desired, a member pivoted to revolve about the common axis of said shaft portion, and connections between said clutches and said pivoted member whereby said clutches are withdrawn to release said registers from their shaft portion when said pivoted member has turned to a given position.

4. An indicating apparatus comprising, in combination, a plurality of indicators, each for a given object, each including a plurality of registers, the registers for each indicator having shaft portions connected to operate in unison, and clutches for holding the registers rigid with said shaft portions. a movable member associated with each of said indicators, connections between said movable member and said clutches whereby said registers are clutched to said shaft portions or released therefrom, depending upon the position of said member, a control station, and means whereby the operator at said control station may select a given one of said indicators for operation, said selecting means initiating the movement of said member of the selected indicator if the same is in the position in which the registers of said indicator are clutched to their shaft portions.

5. In combination, a plurality of indicators and motors therefor, a control station, a machine at said control station, said motors being adapted to operate in electrical synchronism with said station machine, said motors being normally stationary and in different angular positions, means whereby the operator as said station may select any one of the said motors, means whereby said selecting action initiates a motion of the selected motor, and means whereby the selected motor may be connected in electrical synchronism with said station machine.

6. In combination, a plurality of indicators and motors therefor, a control station, a machine at said control station, said motors being adapted to operate in electrical synchronism with said station machine, said motors being normally stationary and in different angular positions, means whereby the operator at said station may select any one of said motors, means whereby said selecting action initiates a motion of the selected motor, means whereby the selected motor may be connected in electrical synchronism with said station machine, and means whereby the operator at said control station may turn said station machine and said selected motor in unison in either direction.

7. An indicating apparatus comprising, in combination, a plurality of indicators, each for a given object, said indicators each having a shaft, motors for moving said shafts in either direction as desired, a control station means at said station whereby a desired indicator-motor may be selected and turned a desired distance in either direction, a spring coupling intermediate each of said motor shafts and the shaft of the corresponding indicator, and locking means associated with each indicator shaft for holding the same normally stationary.

8. An indicating apparatus comprising, in combination, a plurality of indicators, each for a given object, said indicators each having a shaft, motors for moving said shafts in either direction as desired, a control station, means at said station whereby a desired indicator-motor may be selected and turned a desired distance in either direction, a spring coupling intermediate each of said motor shafts and the shaft of the corresponding indicator, locking means associated with each indicator shaft for holding the same normally stationary, and means for releasing said locking means automatically when the motor has been operated in a given direction.

9. An indicating apparatus comprising, in combination, a plurality of indicators, each for a given object, said indicators each having a shaft, motors for moving said shafts in either direction as desired, a control station, means at said station whereby a desired indicator-motor may be selected and turned a desired distance in either direction, a spring coupling intermediate each of said motor shafts and the shaft of the corresponding indicator, locking means associated with each indicator shaft for holding the same normally stationary, and manually controlled means whereby said locking means may be released.

10. An indicating apparatus comprising, in combination, a plurality of indicators, each for a given object, said indicators each having a shaft, motors for moving said shafts in either direction as desired, a control station, means at said station whereby a desired indicator-motor may be selected and turned a desired distance in either direction, a spring coupling intermediate each of said motor shafts and the shaft of the corresponding indicator, locking means associated with each indicator shaft for holding the same normally stationary, and a common operating means for unlocking a plurality of said locking means 11. An indicating apparatus comprising, in combination, a plurality of indicators, each including a drive member and a plurality of registers, one of said registers indicating the current position of said member, another of said registers indicating normally the initial position of said current register, a third register indicating the high position of said current register and a forth register indicating the low position of said current register, a control station, means for locking said initial high, low and current registers together at the time of their first daily operation, and means controlled from said station for releasing said locking means after said first daily operation.

12. An indicating apparatus comprising, in combination, a plurality of indicators, each including a drive member and a plurality of registers, one of said registers indicating the current position of said member, another of said registers indicating normally the initial position of said current register, a third register indicating the high position of said current register and a fourth register for indicating the low position of said current register, a control station, means for locking said initial, high, low and current registers together at the time of their first daily operation, means controlled from said station for releasing said locking means after said first daily operation, the registers in each indicator having shaft portions operated in unison, nuts splined to said shaft portions, sleeves surrounding said nuts and shaft portions in threaded engagement with said nuts, and stops for preventing movement of said nuts beyond certain definite positions.

13. An indicating apparatus comprising, in combination, a plurality of registers having shaft portions in alinement, clutches for holding said registers rigid with their shaft portions when desired, a shutter, and connections between said shutter and said clutches whereby said registers are clutched to their shaft portions and released therefrom according to the position of said shutter.

14. An indicating apparatus comprising, in combination, a plurality of registers having shaft portions in alinement, clutches for holding said registers rigid with their shaft portions when desired, a shutter adapted in one position to screen said registers and arranged to drop from said position by gravity, and connections between said clutches and said shutter whereby said clutches are withdrawn to release said registers when said shutters are allowed to drop.

15. An indicating apparatus comprising, in combination, a plurality of registers having shaft portions in alinement, clutches for holding said registers rigid with their shaft portions when desired, shutters adapted in one position to screen said registers and arranged to drop from said position by gravity, connections between said clutches and said shutters whereby said clutches are withdrawn to release said registers when said shutters are allowed to drop, a control station, and means whereby the dropping of said shutters is determined from said station.

16. An indicating apparatus comprising, in combination, a plurality of indicators, each for a given object, each including a plurality of registers, the registers for each indicator having alined shaft portions and clutches for holding the registers rigid with said shaft portions, shutters for said indicators arranged to screen the same in one position and drop from said screening position by gravity, a control station, and means whereby the operator at said control station may select a given one of said indicators for operation, said selecting means initiating the dropping of the shutter of the selected indicator if the same is in position to screen its indicator.

17. An indicating apparatus comprising, in combination, a plurality of indicators, each for a given object, each including a plurality of registers, the registers for each indicator having alined shaft portions and clutches for holding the registers rigid with said shaft portions, shutters for said indicators arranged to screen the same in one position and drop from said screening position by gravity, a control station, means whereby the operator at said control station may select a given one of said indicators for operation, said selecting means initiating the dropping of the shutter of the selected indicator if the same is in position to screen its indicator, means for retaining said shutters in intermediate positions, and means for releasing said shutters from said intermediate positions, said clutches being withdrawn to release said registers from their shaft portions only after the shutters have been released from said intermediate position.

18. An indicating apparatus comprising, in combination, a plurality of indicators, each for a given object, each including a plurality of registers, the registers for each indicator having alined shaft portions and clutches for holding the registers rigid with said shaft portions, shutters for said indicators arranged to screen the same in one position and drop from said screening position by gravity, a control station, means whereby the operator at said control station may select a given one of said indicators for operation, said selecting means initiating the dropping of the shutter of the selected indicator if the same is in position to screen its indicator, means for retaining said shutters in intermediate positions, means for releasing said shutters from said intermediate positions, said clutches being withdrawn to release said registers from their shaft portions only after the shutters have been released from said intermediate position, and means for indicating to the operator the fact that the shutter of the last operated indicator is standing in said intermediate position.

19. An indicating apparatus comprising, in combination, a plurality of indicators, shutters for said indicators arranged to screen the indicators in a given position and to drop from said position by gravity, means for holding said shutters in an intermediate position, a control station, means whereby the operator at said station may control said indicators individually, and means whereby said operator may individually release said shutters from said intermediate position.

20. An indicating apparatus comprising, in combination, a plurality of indicators, shutters for said indicators arranged to screen the indicators in a given position and to drop from said position by gravity, means for holding said shutters in an intermediate position, a control station, means whereby the operator at said station may control said indicators individually, means whereby said operator may individually release said shutters from said intermediate position, and means at said control station for indicating to said operator when a shutter is standing at said intermediate position.

21. An indicating apparatus comprising, in combination, a plurality of indicators each for a given object and including a plurality of registers, the registers of each indicator having shaft portions and certain of them including releasable means for holding them rigid with said shaft portions and one-way clutches for operating them from said shaft portions in addition to said releasable means, a control station, means whereby the operator at said station may control said indicators individually, means at said control station whereby the operator may release said releasable means, and means at said control station for indicating to the operator the fact that a given indicator has completed its initial daily operation.

22. An indicating apparatus comprising, in combination, a plurality of indicators, electric motors for said indicators adapted to turn in a given direction by inductive action, a stop means for preventing said motors from passing a given position when turning as induction machines, a control station, a synchronous machine at said control station, means including said stop means whereby the operator at said control station may throw one of said motors standing in said given position into synchronism with said synchronous machine and thereupon turn the machines in synchronism a desired amount to cause a given indication on one of said indicators.

23. An indicating apparatus comprising, in combination, a plurality of indicators, electric motors for said indicators adapted to operate either as induction or as synchronous machines, a control station, a synchronous machine at said control station, and means whereby the operator at said control station may throw any desired one of said motors into synchronism with said station machine and thereupon turn the machines in synchronism a desired amount to cause a given indication on one of said indicators.

24. An indicating apparatus comprising, in combination, a plurality of indicators, electric motors for said indicators adapted to operate as either induction or synchronous machines, stop means for preventing said motors from passing a given position when turning as induction machines, a control station, a synchronous machine at said control station, means at said control station whereby said station machine automatically turns to a given position wherein it may be connected in synchronism with any of said motors held by said stop means, and means at said station whereby said station machine and said motor may be connected in synchronism and turned a desired amount to cause a given indication on one of said indicators.

25. An indicating apparatus comprising, in combination, a plurality of indicators, electric motors for said indicators, a control station, means at said control station whereby the operator may select a given one of said motors, said selecting means including an individual relay for each motor arranged to connect its motor to operate as an induction machine, a synchronous machine at said control station, and an operator-controlled relay at said station for changing the connections of the selected motor from an induction machine and for connecting it in synchronism with said station machine.

26. An indicating machine comprising, in combination, a plurality of indicators, electric motors for said indicators, a control station, means at said control station whereby the operator may select a given one of said motors, said selecting means including an individual relay for each motor arranged to connect its motor to operate as an induction machine, a synchronous machine at said control station, an operator-controlled relay at said station for changing the connections of the selected motor from an induction machine and for connecting it in synchronism with said station machine, and means whereby said station machine and said selected motor may be turned a desired amount to cause a given indication on one of said indicators.

27. An indicating apparatus comprising, in combination, a plurality of indicators, electric motors for said indicators, a control station, means at said control station whereby the operator may select a given one of said motors, said selecting means including an individual relay for each motor arranged to connect its motor to operate as an induction machine, a synchronous machine at said control station, an operator-controlled relay at said station for changing the connections of the selected motor from an induction machine and for connecting it in synchronism with said station machine, means whereby said station machine and said selected motor may be turned a desired amount to cause a given indication on one of said indicators, a resilient coupling intermediate each of said motors and its indicator locking means for holding said indicators stationary, a relay for releasing said locking means, and means for operating said relay approximately at the end of the movement of each operating motor.

28. An indicating apparatus comprising, in combination, a plurality of indicators each for a given object, electric motors for turning said indicators, a control station, means at said station whereby a desired indicator motor may be turned a desired distance in either direction, a resilient coupling intermediate each of said motors and its indicator, locking means for holding said indicator shafts normally stationary, and means for automatically releasing said locking means approximately at the end of any movement of a motor.

29. An indicating apparatus comprising, in combination, a plurality of indicators, alternating current motors for said indicators, having wound stators and rotors, a control station, an alternating current machine at said control station having a wound stator and rotor, alternating current supply lines multipled to the stators of each of said motors and said station machine, means for selecting a desired one of said motors comprising a relay arranged to close the circuit through the stator of its corresponding motor, a set of rotor trunk lines normally short-circuited, said selecting relay also connecting the rotor of its motor to said trunk lines and a relay for removing the short-circuit from said rotor trunk lines and connecting the same with said station machine to throw the station machine in synchronism with the selected motor.

30. An indicating apparatus comprising, in combination, a plurality of indicators, alternating current motors for said indicators, said motors having wound stators and rotors, a control station, an alternating current machine at said control station having a wound stator and rotor, alternating current supply lines multipled to the stators of each of said motors and said station machine, means for selecting a desired one of said motors comprising a relay arranged to close the circuit through the stator of its corresponding motor, a set of rotor trunk lines normally short-circuited, said selecting relay also connecting the rotor of its motor to said trunk lines, the selected motor being free to turn a certain distance as an induction motor in a given direction, stop means for determining the position of the selected rotor at the end of its induction run, stop means for determining the normal position of said station machine, and a relay for removing the short circuit from said rotor trunk lines and connecting the same with said station machine to throw the station machine in synchronism with the selected motor.

31. In an indicating apparatus, in combination, a plurality of indicators and motors therefor, a control station, a machine at said control station, said motors being adapted to operate in electrical synchronism with said station machine, said motors being normally stationary and in different angular positions, means whereby the operator at said station may synchronize any desired one of said motors with said station machine irrespective of the initial difference of angular position between the two machines, means for normally locking said indicators against rotation, and means for releasing said locking means after the movement of said motors.

32. In an indicating apparatus, in combination, a plurality of relays having motors individually associated therewith, a lock relay in series with a group of said motor relays, individual keys for closing the circuit including any one of said motor relays and said lock relay, a resistance arranged to prevent the operation of said lock relay, but insufficient to prevent the operation of said motor relays, and means whereby said resistance may be shunted.

33. In an indicating apparatus, in combination, a plurality of relays having motors individually associated therewith, a lock relay in series with a group of said motor relays, individual keys for closing the circuit including any one of said motor relays and said lock relay, a resistance arranged to prevent the operation of said lock relay but insufficient to prevent the operation of said motor relays, and automatic means whereby said resistance may be shunted.

34. In an indicating apparatus, in combination, a plurality of relays having motors associated therewith, a lock relay in series with said motor relays, individual keys for closing the circuit including any one of said motor relays and said lock relay, a resistance arranged to prevent the operation of said lock relay but insufficient to prevent the operation of said motor relays, a control station, and a relay at said control station having contacts arranged to shunt said resistance.

35. In an indicating apparatus, in combination, a plurality of motor relays, a lock relay in series with each of said motor relays, a control station, individual keys at said control station for selecting a desired one of said motor relays, a resistance at said control station arranged to prevent the operation of said lock relay but insufficient to prevent the operation of said motor relays, an electrical machine at said control station, a synchronizing relay at said station having contacts for synchronizing said station machine with any one of said motors and also having contacts for closing a circuit around said resistance, and means for interrupting said circuit around said resistance during a portion of the time that it is closed by said synchronizing relay.

36. The combination in an indicating apparatus of a plurality of motors adapted to operate as induction motors, stop means by which said motors are normally held at a certain point in their operation as induction motors, and an operator-controlled means for removing said stop means from the paths of said motors.

37. The combination in an indicating apparatus of a plurality of motors adapted to operate as induction motors, stop means by which said motors are normally held at a certain point in their operation as induction motors, an operator-controlled means for removing said stop means from the paths of said motors, and escapement means for preventing an undesired degree of movement on the part of the motors when released.

38. In an indicating aparatus, in combination, a plurality of motors adapted to operate as induction motors, stop means normally interposed in the path of said induction motors for stopping them at a given point in their rotation, an electro-magnet whereby said stop means may be removed from the path of said motors, a resistance normally in the circuit of said magnet preventing the operation thereof, and means whereby said resistance may be shunted to permit the operation of the said magnet.

39. In an indicating apparatus, in combination, a shutter mounted to drop out of screening position by gravity, catches on said shutter, an electro-magnet having an armature, a member carried by the armature of said electro-magnet arranged to co-operate with said catches and to cause said shutter to drop to its final position in two steps, one of said catches being inclined to a plane perpendicular to the axis of rotation of the shutter, whereby it may swing said member on the relay armature out of its path as the shutter is raised to screening position.

40. An indicating apparatus, comprising, in combination, a shutter mounted to drop away from screening position by gravity, means whereby said shutter is caused to drop to its final position in two steps, a lever for raising said shutter to screening position, and a resilient connection between said lever and said shutter.

41. In indicating apparatus, comprising in combination, an indicator including a plurality of registers, one of said registers indicating the current quotation of a given article, another of said registers indicating normally the initial position of said current register, a third register indicating the high position of said current register, and a fourth register indicating the low position of said current register, means for locking said initial, high, low and current registers together at the time of their first daily operation, a control station, and means controlled from said station whereby said locking means may be released after said first daily operation.

42. An indicating apparatus, comprising in combination, an indicator including a plurality of registers, one of said registers indicating the current quotation of a given article, another of said registers indicating normally the initial position of said current register, means for locking said initial and current registers together at the time of their first daily operation, a control station, and means controlled from said station for releasing said locking means after said first daily operation.

43. An indicating apparatus, comprising in combination, an indicator including a plurality of registers, one of said registers indicating the current quotation of a given article, another of said registers indicating normally the initial position of said current register, means for locking said initial and current registers together at the time of their first daily operation, a control station, and means controlled from said station for releasing said locking means after said first daily operation, said locking means including shaft portions for said registers, nuts splined to said shaft portions, sleeves surrounding said nuts and shaft portions in threaded engagement with said nuts, and stops for preventing movement of said nuts beyond certain definite positions.

44. An indicating apparatus comprising, in combination, a plurality of registers, each having shaft portions operating in unison, a common operating motor for said shaft portions acting to turn the shaft portions in one direction or the other at the will of the operator, clutches for holding said registers rigid with their shaft portions when desired, means whereby said clutches may be actuated to release said registers from their shaft portions when desired, and automatic means for turning one of said registers only when the operating motor turns in one direction and another only when the operating motor turns in the other direction when said clutches are released.

45. An indicating apparatus comprising, in combination, a plurality of register means having shaft portions operated in unison, clutches for holding certain of said registers rigid with their shaft portions when desired, one of said registers being permanently fixed to its shaft portion, means whereby said clutches may be released from their shaft portions when desired, and means whereby at least one of said unclutched registers may be operated in a given direction subsequent to its release from its shaft portion.

46. In an indicating apparatus, in combination, a plurality of indicators and motors therefor, a central station machine, said motors being adapted to operate in electrical synchronism with said central machine, a series of keys at said station, one for each indicator, a means whereby a rotor of any desired indicator motor is automatically brought into the same angular position with respect to its stator as that occupied by said central station machine upon the operation of the key corresponding to the given indicator.

47. In an indicating apparatus, in combination, a plurality of indicators and motors therefor, a central station machine, said motors being adapted to operate in electrical synchronism with said central machine, a series of keys at said station, one for each indicator, a means whereby a rotor of any desired indicator motor is automatically brought into the same angular position with respect to its stator as that occupied by said central station machine upon the operation of the key corresponding to the given indicator, a series of keys which are adapted to turn said central station machine and means whereby said central station machine is automatically connected to operate in synchronism with the motor of said given indicator upon the operation of one of said second mentioned set of keys.

48. In combination, a plurality of indicators and motors therefor, a control station, a machine at said control station, said motors being adapted to operate in electrical synchronism with said station machine, said motors being normally stationary and in different angular positions, means whereby the operator at said station may select any one of said motors and connect the same in electrical synchronism with said station machine irrespective of the initial difference of angular position between the two machines, means for normally locking said indicators against rotation, and means for releasing the indicator of said selected motor.

49. An indicating apparatus comprising, in combination, a plurality of registers having shaft portions operating in unison, a common operating motor for said shaft portions, each of said registers having a plurality of number bearing dials, one of which is operated directly from the corresponding shaft portion, carrying mechanism intermediate the dials of the registers, clutches for holding certain of said directly driven dials rigid with their shaft portions when desired, and means whereby certain of said directly operated dials are turned only when said motor is operated in given directions.

50. In an indicating apparatus in combination, a group of high, low and current registers for each article, means whereby a desired set of registers may be selected and operated from a central station, means for covering said registers prior to their initial operation for a given period of operation, and means whereby a given group of registers is automatically uncovered at the initial operation for a given period.

51. In an indicating apparatus in combination, a group of high, low and current registers, one group for each article, means whereby a desired set of registers may be selected and operated from a central station, means for covering said groups of registers prior to their initial operation for a given period, means whereby a given group of registers is automatically uncovered at the initial operation for a given period, means whereby the high, low and current registers of each group are clutched together until after the initial operation for a given period, and means controlled from said station whereby the registers of a given group may be unclutched after the initial operation of such given group for a given period.

WINTHROP G. THOMAS.